(12) United States Patent
Aoba

(10) Patent No.: US 9,239,234 B2
(45) Date of Patent: Jan. 19, 2016

(54) WORK SYSTEM AND INFORMATION PROCESSING METHOD

(75) Inventor: Masato Aoba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1263 days.

(21) Appl. No.: 12/620,886

(22) Filed: Nov. 18, 2009

(65) Prior Publication Data

US 2010/0131235 A1   May 27, 2010

(30) Foreign Application Priority Data

Nov. 26, 2008 (JP) ................. 2008-301714

(51) Int. Cl.
| | | |
|---|---|---|
| G06F 15/00 | (2006.01) | |
| G01B 11/14 | (2006.01) | |
| G01B 11/25 | (2006.01) | |
| G01B 11/24 | (2006.01) | |
| G06T 7/00 | (2006.01) | |
| B25J 9/16 | (2006.01) | |

(52) U.S. Cl.
CPC ............ *G01B 11/2518* (2013.01); *G01B 11/24* (2013.01); *G01B 11/25* (2013.01); *G01B 11/2504* (2013.01); *G06T 7/004* (2013.01); *B25J 9/1697* (2013.01)

(58) Field of Classification Search
USPC .................. 702/150, 152–151, 189; 356/615; 901/47
See application file for complete search history.

(56) References Cited

U.S. PATENT DOCUMENTS

| 4,575,304 A | * | 3/1986 | Nakagawa et al. ............ 414/730 |
| 5,102,223 A | * | 4/1992 | Uesugi et al. ................. 356/607 |
| 2005/0102060 A1 | * | 5/2005 | Watanabe et al. ............. 700/245 |
| 2008/0082213 A1 | * | 4/2008 | Ban et al. ...................... 700/260 |

FOREIGN PATENT DOCUMENTS

| JP | 2005-163346 | 6/2005 |
| JP | 2005-271103 | 10/2005 |

* cited by examiner

*Primary Examiner* — Andrew Schechter
*Assistant Examiner* — L. Anderson
(74) *Attorney, Agent, or Firm* — Fitzpatrick, Cella, Harper & Scinto

(57) ABSTRACT

A work system includes an arm mechanism, a position and an orientation of which are configured to be changed so as to process an object placed on a work area, a member arranged at a distal end portion of the arm mechanism to receive a light projection pattern for calculating a position and an orientation of the distal end portion of the arm mechanism, and an irradiation unit configured to form the light projection pattern on the member and on the object by irradiating the member and the object with pattern light. In addition, an image sensing unit senses an image of the object and is fixed at a position independent of the arm mechanism, and a first calculation unit calculates a position and an orientation of the distal end portion of the arm mechanism and an irradiation plane of the pattern light based on the light projection pattern formed on the member. A second calculation unit calculates a position and an orientation of the object based on the calculated irradiation plane and the light projection pattern formed on the object.

19 Claims, 13 Drawing Sheets

F I G. 11
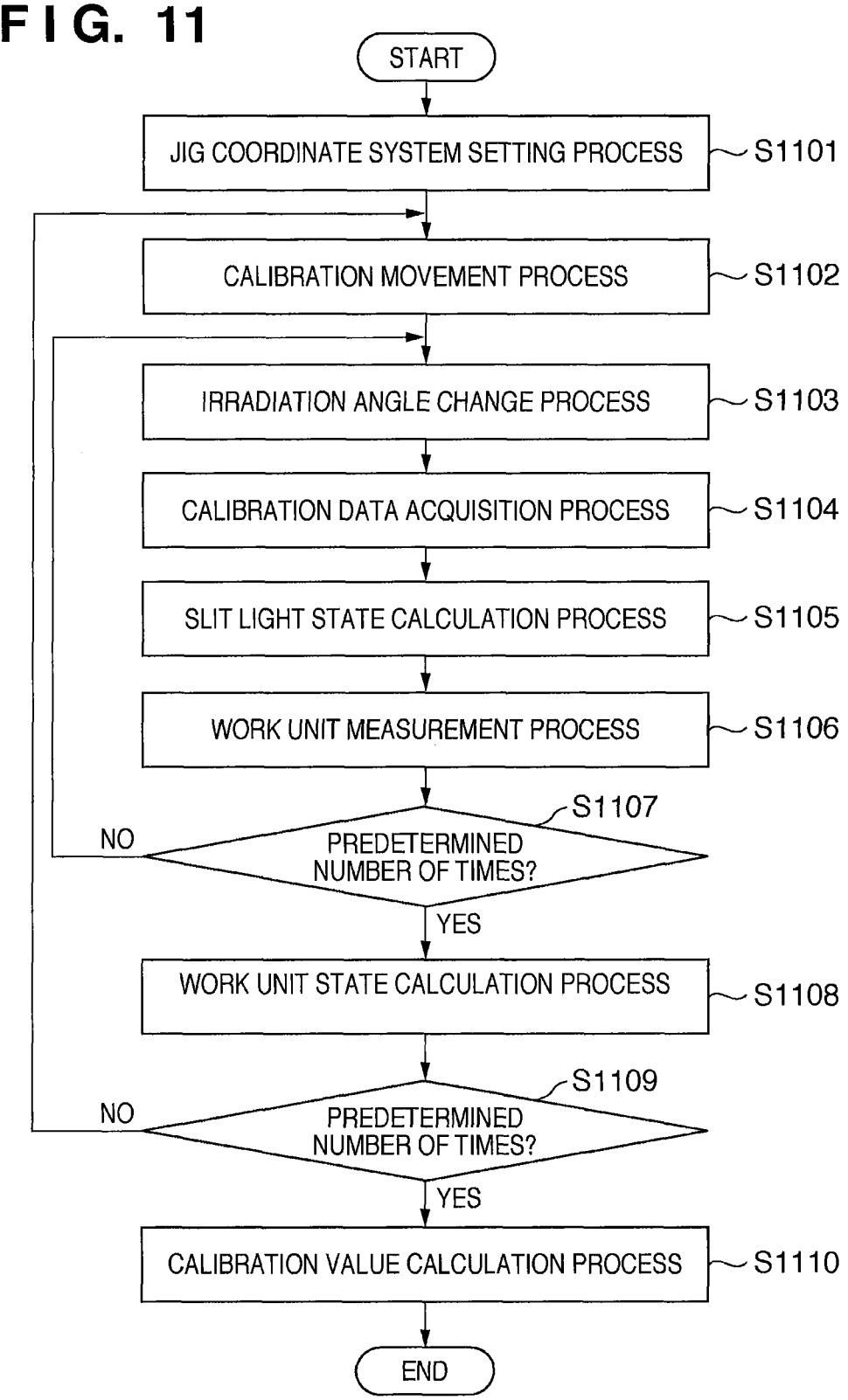

FIG. 15
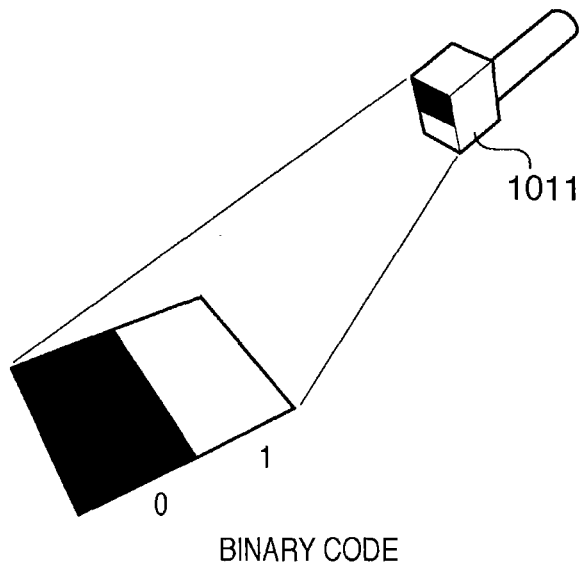
BINARY CODE
FIG. 16
| LIGHT PROJECTION PATTERN 1 | LIGHT PROJECTION PATTERN 2 | LIGHT PROJECTION PATTERN 3 |
|---|---|---|
|  | 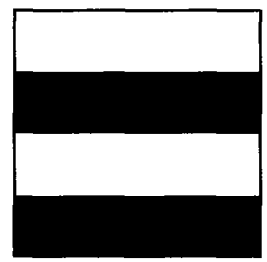 | 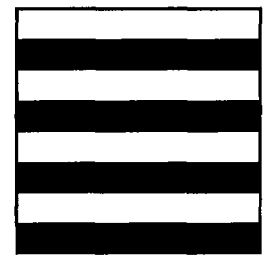 |
111
110
101
100
011
010
001
000

WORK SYSTEM AND INFORMATION PROCESSING METHOD

BACKGROUND OF THE INVENTION

1. Field of the Invention

The present invention relates to a work system which includes an arm mechanism used to execute a predetermined work for a target object, and an information processing method in the work system.

2. Description of the Related Art

In a work system which includes an arm mechanism used to execute a predetermined work for a target object whose position and orientation change, the position and orientation (three-dimensional (3D) information) of the target object are required to be measured upon execution of the work, and a light-section method is known as the measuring method.

The light-section method is a method that acquires 3D information of the target object by executing a triangulation by combining a camera and slit light projector, and various proposals about this method have been conventionally made in association with application to the work system.

For example, Japanese Patent Laid-Open No. 2005-271103 proposes a position calibration method of an origin when a 3D scanner (image sensing device and slit light projector) is mounted on a robot arm. Also, Japanese Patent Laid-Open No. 2005-163346 discloses a method of focusing an emitted beam light on a target object when a 3D scanner (image sensing device and slit light projector) is mounted on a robot arm.

However, both the work systems disclosed in these patent references are premised on the arrangement which integrates the image sensing device and slit light projector. For this reason, if the image sensing device is arranged at a global position (a fixed position not on the robot arm), the slit light projector is also arranged at the global position. When the image sensing device is arranged on the robot arm, the slit light projector is also fixed on the robot arm.

However, when the image sensing device and slit light projector are arranged at the global position, occlusion of slit light emitted by the slit light projector by the target object itself or the robot arm cannot be avoided depending on the position or orientation of the target object. Also, the focal depth of the emitted slit light often limit a precise measurement range. These problems disturb achievement of high measurement precision.

On the other hand, when the image sensing device and slit light projector are arranged on the robot arm, they cannot be arranged so as to be spaced apart from each other. Since the light-section method measures based on the principle of triangulation, when the distance between the image sensing device and slit light projector is short, and an angle the optical axis of the image sensing device makes with that of the slit light projector (optic angle) is small, the measurement precision in the depth direction is decreased.

When the robot arm has a small size, it is difficult to arrange the image sensing device which has a high resolution and a large weight. In this case, high measurement precision cannot be expected.

SUMMARY OF THE INVENTION

The present invention has been made in consideration of the aforementioned problems.

A work system according to the present invention comprises the following arrangement. That is, a work system comprising: an arm mechanism, a position and an orientation of which are configured to be changed so as to execute a predetermined work for an object to be processed placed on a work area; a member arranged at a distal end portion of the arm mechanism; an irradiation unit configured to form a light projection pattern on the member and on the object to be processed by irradiating the member and the object to be processed with pattern light, the irradiation unit being arranged on the arm mechanism to have a constant relative position with respect to the member; an image sensing unit configured to sense an image of the object to be processed, the image sensing unit being fixed at a position independent of the arm mechanism; a first calculation unit configured to calculate a position and an orientation of the distal end portion of the arm mechanism and an irradiation plane of the pattern light based on the light projection pattern formed on the member included in image data of the object to be processed which is obtained by image sensing by the image sensing unit; and a second calculation unit configured to calculate a position and an orientation of the object to be processed based on the calculated irradiation plane and the light projection pattern formed on the object to be processed included in the image data of the object to be processed which is obtained by image sensing by the image sensing unit.

According to the present invention, in a work system which comprises an arm mechanism used to execute a predetermined work while measuring three-dimensional information of a target object by the light-section method with respect to the target object whose position and orientation change, high measurement precision can be assured.

Furthermore, a three-dimensional information measurement method and calibration method based on the light-section method, which are applied to the work system, can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flowchart showing the sequence of calibration processing in the work system;

FIG. 15 is a view showing an example of a sensed image using binary pattern light projected by a pattern light projector; and FIG. 16 is a view showing examples of light projection patterns projected by the pattern light projector.

DESCRIPTION OF THE EMBODIMENTS

Embodiments of the present invention will now be described in detail in accordance with the accompanying drawings.

First Embodiment

<1. Outer Appearance Arrangement of Work System>

Figure 1:
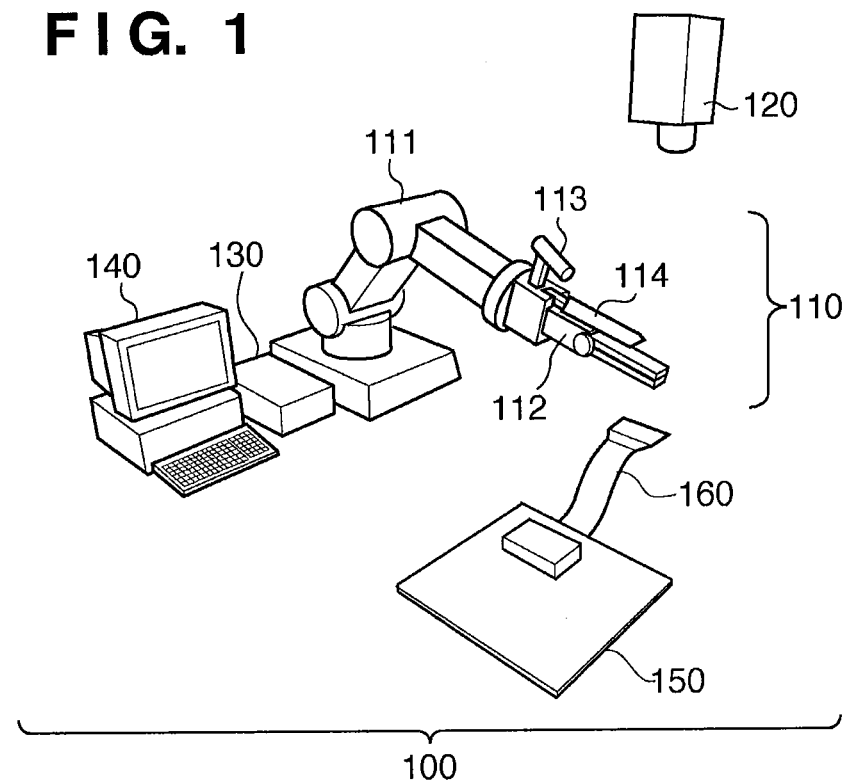
FIG. 1 is a view showing the outer appearance arrangement of a work system according to the first embodiment of the present invention.

FIG. 1 is a view showing the outer appearance arrangement of a work system 100 according to the first embodiment of the present invention. Referring to FIG. 1, reference numeral 110 denotes a work unit which includes an arm mechanism used to execute a predetermined work for an object to be processed (target object). Reference numeral 111 denotes a robot arm. A robot hand 112 as a member (end effector) which contacts the target object and executes the predetermined work is attached to the distal end portion of the robot arm 111. Note that the robot arm 111 and robot hand 112 will be collectively referred to as an arm mechanism hereinafter.

Reference numeral 113 denotes a slit laser projector (slit light projector) which serves as a light projection unit. The slit laser projector 113 is attached to the distal end portion of the robot arm 111, and emits laser slit light as pattern light.

Reference numeral 114 denotes a hand position detection member which serves as a detection member. The hand position detection member 114 is attached to be parallel to the robot hand 112 so that a relative position with respect to the slit laser projector 113 remains unchanged (to be constant).

The robot arm 111, robot hand 112, slit laser projector 113, and hand position detection member 114 configure the work unit 110.

Reference numeral 120 denotes a camera which serves as an image sensing unit. The camera 120 is arranged independently of the robot arm 111 so as to sense an image in a work area where the predetermined work is executed over the robot arm 111.

Reference numeral 130 denotes a robot controller which serves as a work control unit. The robot arm 111 is connected to the robot controller 130, and the robot arm 111 and robot hand 112 are controlled by the robot controller 130.

Reference numeral 140 denotes a computer which serves as a calculation unit. The computer 140 executes information processing required to control the robot arm 111 and robot hand 112 via the robot controller 130. Also, the computer 140 calculates the position and orientation (3D information) of the target object based on image data sensed by the camera 120. Reference numeral 150 denotes a work area where a target object 160 to be worked by the work unit 110 is placed.

As described above, the work system 100 according to this embodiment adopts the arrangement in which the image sensing unit 120 is arranged at a position independent of the robot arm 111 without integrating the camera 120, slit laser projector 113, and hand position detection member 114. Also, the work system 100 adopts the arrangement in which the slit laser projector 113 and hand position detection member 114 are arranged on the robot arm 111.

With this arrangement, problems related to occlusion and that of the focal depth of beam light can be avoided. Since a large optic angle can be assured, high measurement precision can be attained even in the depth direction, and the camera with a high resolution (i.e., with a large weight) can be arranged irrespective of the size of the robot arm.

<2. Outer Appearance Arrangement of Work Unit>

Figure 2:
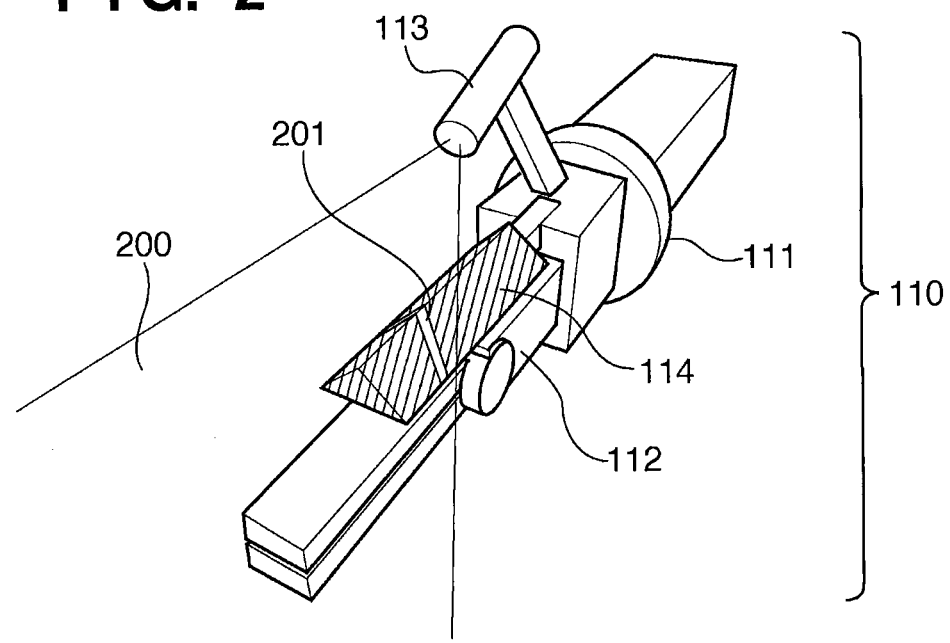
FIG. 2 is a view showing the outer appearance arrangement of a work unit.

The outer appearance arrangement of the work unit will be described below. FIG. 2 is a view showing the outer appearance arrangement of the work unit 110.

Referring to FIG. 2, reference numeral 200 denotes a light-section plane formed by slit light emitted by the slit laser projector 113. If an object exists at a position that intersects with the light-section plane 200, a light-section line is generated at a position where that object and the light-section plane intersect with each other.

Reference numeral 201 denotes a light-section line which is generated when the light-section plane 200 of the slit light emitted by the slit laser projector 113 intersects with the hand position detection member 114.

Assume that the slit laser projector 113 is arranged at a position and angle which allow the light-section plane 200 of the emitted slit light to generate the light-section line 201 on the hand position detection member 114.

Also, assume that the hand position detection member 114 has a shape whose position and orientation are uniquely determined based on the light-section line 201. More specifically, assume that the section of the hand position detection member 114 has a triangular shape, so that the light-section line 201 is bent halfway (i.e., it is defined by two or more straight lines).

<3. Functional Arrangement of Work System>

Figure 3:
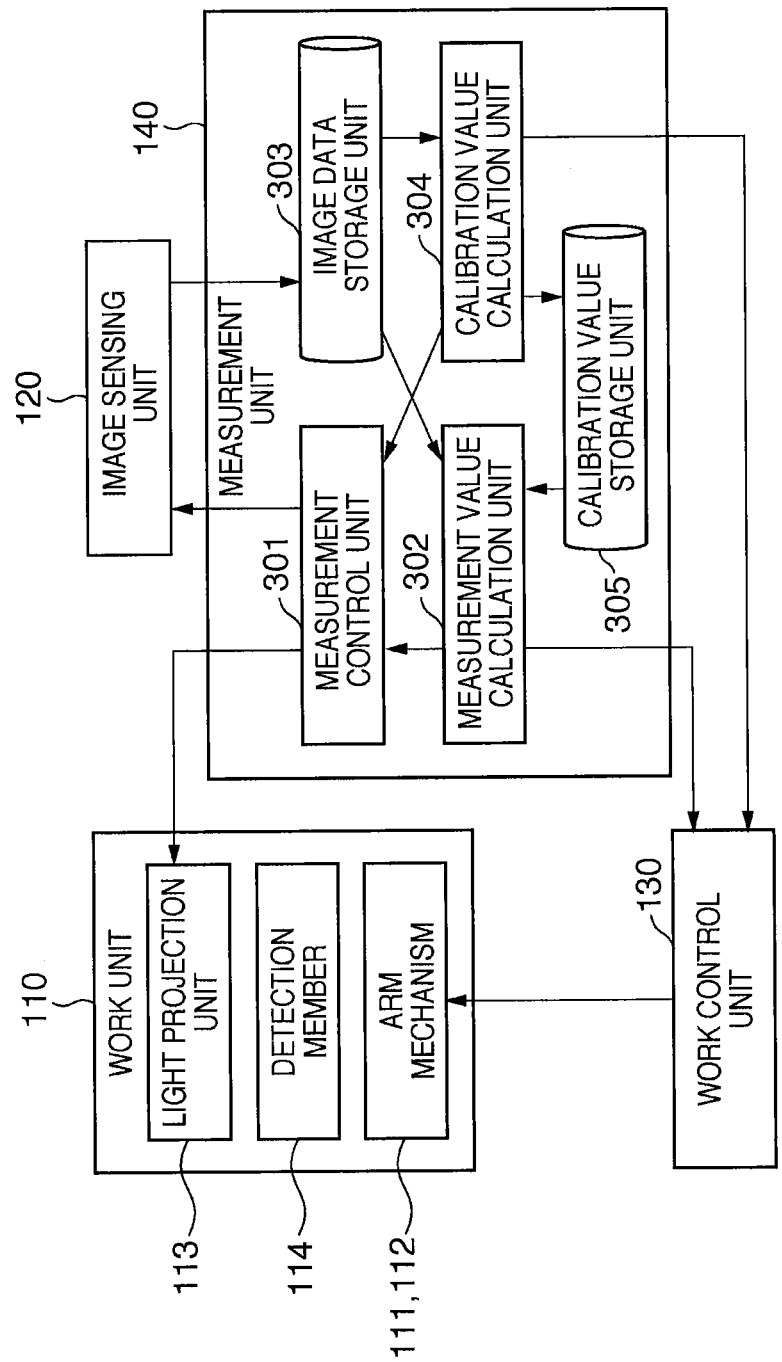
FIG. 3 is a block diagram showing the functional arrangement of a work system.

The functional arrangement of the work system will be described below. FIG. 3 is a block diagram showing the functional arrangement of the work system 100.

In FIG. 3, since the work unit 110, image sensing unit (camera) 120, and work control unit (robot controller) 130 have already been described using FIGS. 1 and 2, a detailed description thereof will not be repeated.

The calculation unit (computer) 140 includes a CPU, RAM, ROM, and storage device (not shown), and executes various functions when the CPU executes programs loaded into the RAM. More specifically, the calculation unit 140 serves as a measurement control unit 301, measurement value calculation unit 302, image data storage unit 303, calibration value calculation unit 304, and calibration value storage unit 305. Note that details of the respective functions will be described later.

<4. Calibration Method Required to Measure 3D Information by Light-Section Method>

The calibration method required to measure the 3D information by the light-section method will be described below.

<4.1 Description of Calibration Jig>

Figure 4:
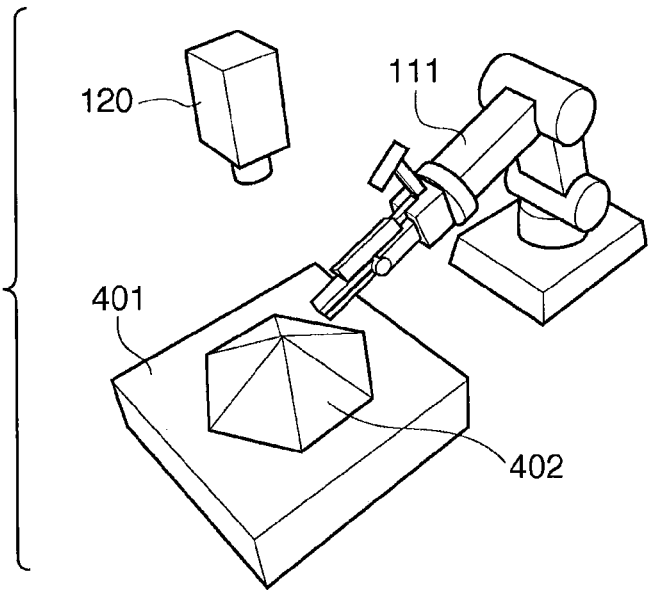
FIG. 4 is a view for explaining a calibration jig used to calibrate the work system.

A calibration jig (a target object having a given position and orientation) used to calibrate the work system 100 will be described first. FIG. 4 is a view for explaining a calibration jig used to calibrate the work system 100.

Referring to FIG. 4, reference numeral 401 denotes a calibration base, which is placed on the work area 150 in place of the target object upon calibration.

Note that the height of the calibration base 401 roughly matches that of the target object, but they need not strictly match.

Reference numeral 402 denotes a calibration jig, which is placed on the calibration base 401. Assume that the calibration jig 402 has at least six vertices having given dimensions, and is defined by a plurality of planes. Also, assume that the relative positional relationship among the vertices is given with high precision.

In the example of FIG. 4, an object of a regular hexagonal pyramid is prepared as the calibration jig 402. However, the present invention is not limited to such specific shape, and other shapes (for example, a pentagonal pyramid, octagonal pyramid, etc.) may be used. A case will be explained below wherein the calibration jig 402 has a shape of a regular hexagonal pyramid.

<4.2 Overview of Calibration Processing>

Figure 5:
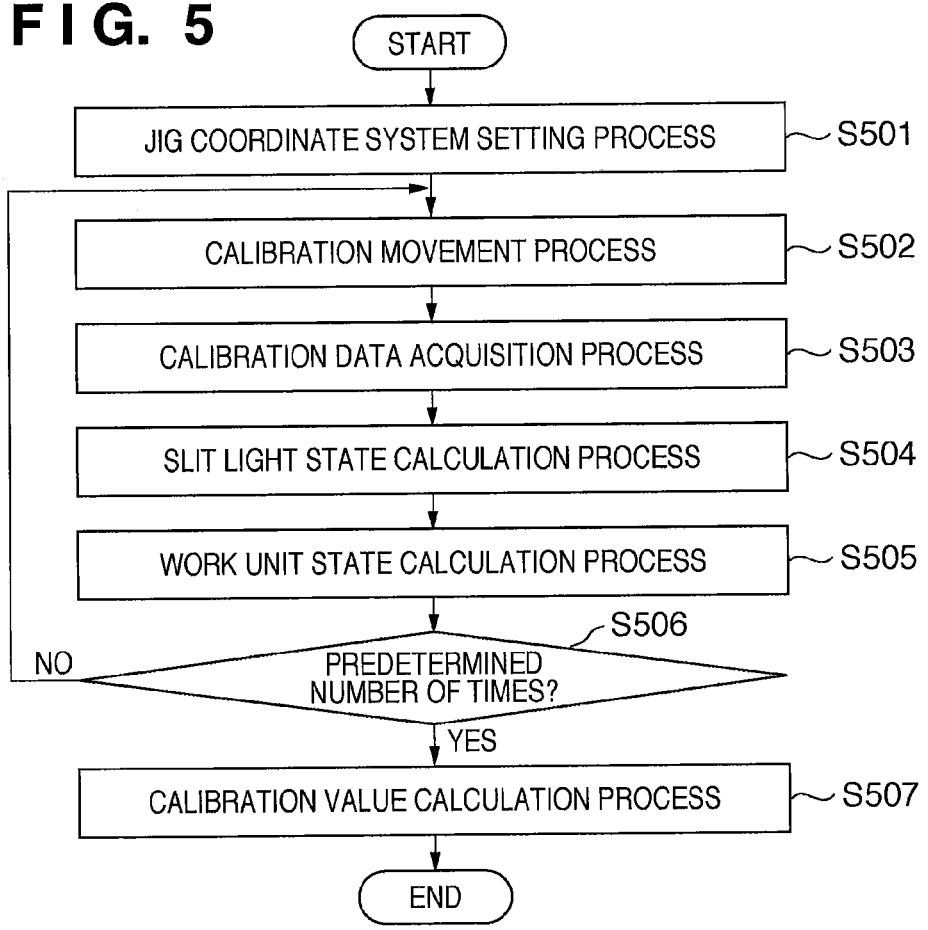
FIG. 5 is a flowchart showing the sequence of calibration processing in the work system.

The sequence of the calibration processing in the work system will be described below. FIG. 5 is a flowchart showing the sequence of the calibration processing in the work system 100.

In step S501 (jig coordinate system setting process), the calibration value calculation unit 304 sends an image sensing instruction to the measurement control unit 301, which sends an image sensing control signal to the image sensing unit 120.

The image sensing unit 120 senses an image in response to the control signal from the measurement control unit 301, and stores acquired image data via the image data storage unit 303.

The calibration value calculation unit 304 sets a jig coordinate system based on the image data stored via the image data storage unit 303, and converts the jig coordinate system into an image coordinate system.

In step S502 (calibration movement process), the calibration value calculation unit 304 sends a moving instruction to a predetermined position to the work control unit 130, which sends a control signal based on that instruction to the work unit 110. The work unit 110 moves to the predetermined position based on the control signal.

In step S503 (calibration data acquisition process), the calibration value calculation unit 304 sends an image sensing start instruction and slit light irradiation start instruction to the measurement control unit 301, which sends control signals to the image sensing unit 120 and light projection unit 113. The image sensing unit 120 starts image sensing and the light projection unit 113 starts emission of slit light in response to the control signals from the measurement control unit 301.

In step S504 (slit light state calculation process), the calibration value calculation unit 304 detects a light-section line on the calibration jig 402 in the image data using the image data stored via the image data storage unit 303. Furthermore, the calibration value calculation unit 304 estimates a state of the slit light on the jig coordinate system by making predetermined calculations with respect to the position of the detected light-section line, and associates the state of the work unit 110 with that of the slit light.

In step S505 (work unit state calculation process), the calibration value calculation unit 304 detects a light-section line on the detection member 114 in the image data using the image data stored via the image data storage unit 303. Furthermore, the calibration value calculation unit 304 estimates a state of the work unit 110 on the jig coordinate system based on the state of the slit light obtained in the slit light state calculation process (step S504) with respect to the position of the detected light-section line, and associates the jig coordinate system of the work unit 110 with a work instruction to the work unit 110.

It is determined in step S506 if image sensing processes of the predetermined number of times are complete. If it is determined that image sensing processes of the predetermined number of times are not complete yet, the process returns to step S502 (calibration movement process). On the other hand, if it is determined that the image sensing processes of the predetermined number of times are complete, the process advances to step S507 (calibration value calculation process).

In step S507 (calibration value calculation process), a correspondence function required to calculate the state of the slit light with respect to an arbitrary state of the work unit 110 is generated based on the corresponding values obtained in the slit light state calculation process (step S504) and the work unit state calculation process (step S505). Also, a correspondence function required to calculate the state of the work unit 110 on a robot coordinate system from the state of the work unit 110 with respect to an arbitrary jig coordinate system is generated. Furthermore, parameters which configure the generated correspondence functions are stored as calibration parameters via the calibration value storage unit 305.

<4.3 Details of Calibration Processing>

Details of the calibration processing in FIG. 5 will be described below.

Figure 6:
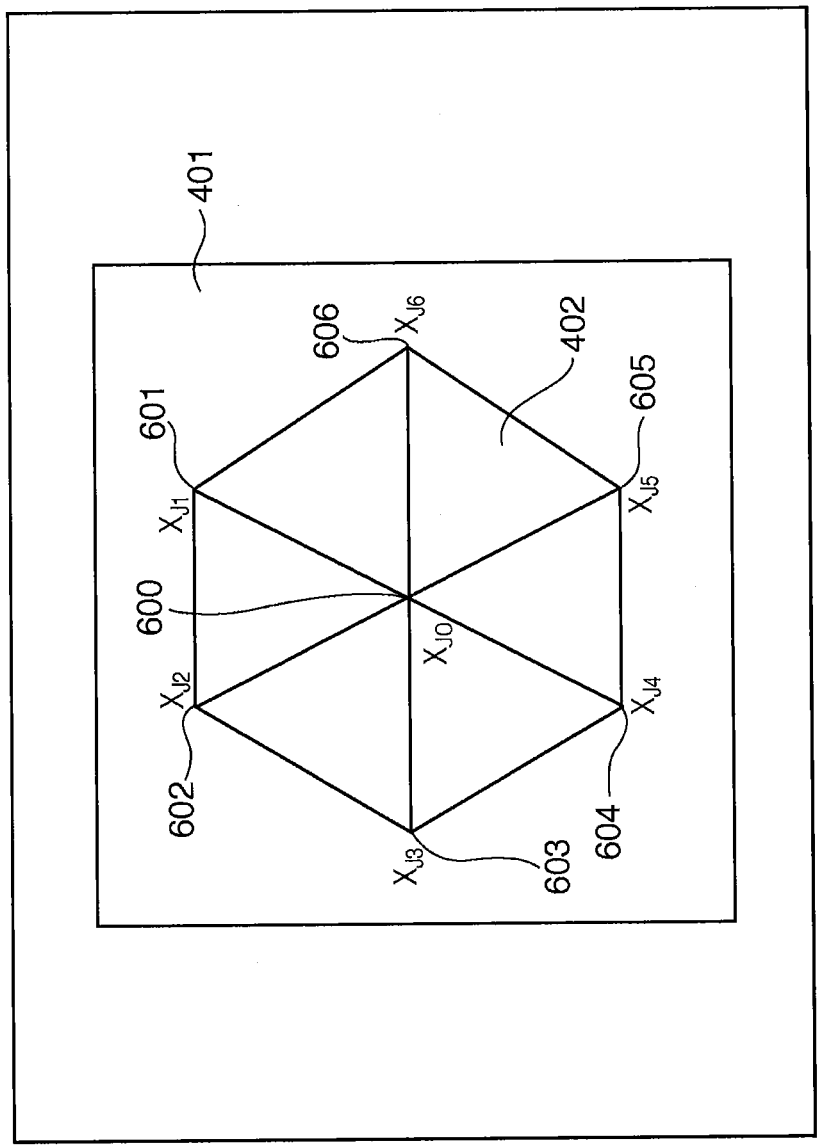
FIG. 6 is a view showing an example of image data obtained by sensing an image of the calibration jig.

In step S501 (jig coordinate system setting process), image data obtained by sensing an image of the calibration jig 402 using the camera 120 is acquired (FIG. 6). Then, the vertices of the calibration jig 402 in the acquired image data are detected by predetermined image processing.

For instance, an equation of straight line is calculated by, for example, the Hough transform from the edge extraction results of respective sides, an intersection of six straight lines is defined as a top vertex 600, and each intersection of three straight lines is defined as a surrounding vertex. Since the calibration jig 402 has the shape of the regular hexagonal pyramid, for example, an arbitrary surrounding vertex is designated as a vertex 601, and vertex numbers may be assigned counterclockwise. Assume that detection positions of vertices 600 to 606 on the image coordinate system are $u_{J0}$ to $u_{J6}$ as a result of detection of the vertices. Note that a position of the top vertex 600 of the calibration base 401 on the jig coordinate system is set to be a jig coordinate system origin $X_{J0}=[0, 0, 0]^T$.

The direction of a jig axis having the origin as the center is arbitrarily defined, and the positions of the vertices 601 to 606 on the jig coordinate system are calculated from $X_{J0}$ based on the physical relative positions from the top vertex 600 and are set as position vectors $X_{J1}$ to $X_{J6}$.

The relationship of the respective coordinate systems will be specified below.

Assume that an arbitrary point $X=[X, Y, Z]^T$ on the jig coordinate system is transformed to a point $x=[x, y, z]^T$ on a normalized image coordinate system by the coordinate transform based on a projection matrix A. At this time, a corresponding point $u=[u, v]^T$ of X on the image coordinate system is expressed by:

$$u' = \frac{1}{z} \times = \frac{1}{z} AX' \qquad (1)$$

where u' and X' are homogeneous coordinates of u and X to have a scale factor=1, and are respectively expressed by u'=[u, $v, 1]^T$ and $X'=[X, Y, Z, 1]^T$. The projection matrix A is a 3×4 matrix, and each row is expressed by the transposition of four-dimensional column vectors and can be described by:

$$A = \begin{bmatrix} a_1^T \\ a_2^T \\ a_3^T \end{bmatrix} \quad (2)$$

Homogeneous coordinates $u'_k=[u_k, v_k, 1]$ associated with image coordinates $u_{Ji}=[u_{Ji}, v_{Ji}]$ associated with the i-th vertex in the vertex detection results of the calibration jig 402 are expressed, from equation (1), by:

$$u'_{Ji} = \frac{1}{z_{Ji}} A X'_{Ji} = \frac{1}{z_{Ji}} \begin{bmatrix} a_1 \cdot X'_{Ji} \\ a_2 \cdot X'_{Ji} \\ a_3 \cdot X'_{Ji} \end{bmatrix} \quad (3)$$

where $z_{Ji}$ is a z-coordinate of the i-th vertex on the normalized image coordinate system, and $X'_{Ji}$ represents homogeneous coordinates of a coordinate value $X_{Ji}=[X_{Ji}, Y_{Ji}, Z_{Ji}]$ of the i-th vertex on the jig coordinate system, which are expressed by $X'_{Ji}=[X_{Ji}, Y_{Ji}, Z_{Ji}, 1]$.

Since $u'_{Ji}$ represents the homogeneous coordinates, it is equivalent when the entire equation is divided by a scale factor $a_3 \cdot X'_{Ji}$ while ignoring $z_{Ji}$. Therefore, respective elements of $u_{Ji}$ can be written as:

$$\begin{cases} u_{Ji} = \dfrac{a_1 \cdot X'_{Ji}}{a_3 \cdot X'_{Ji}} \\ v_{Ji} = \dfrac{a_2 \cdot X'_{Ji}}{a_3 \cdot X'_{Ji}} \end{cases} \quad (4)$$

By modifying these equations, we have:

$$\begin{cases} a_1 \cdot X'_{Ji} - u_{Ji} a_3 \cdot X'_{Ji} = 0 \\ a_2 \cdot X'_{Ji} - v_{Ji} a_3 \cdot X'_{Ji} = 0 \end{cases} \quad (5)$$

Hence, these elements can be described using a matrix in the following format:

$$\begin{bmatrix} X'^T_{Ji} & 0^T & -u_{Ji} X'^T_{Ji} \\ 0^T & X'^T_{Ji} & -v_{Ji} X'^T_{Ji} \end{bmatrix} \begin{bmatrix} a_1 \\ a_2 \\ a_3 \end{bmatrix} = 0 \quad (6)$$

for $0=[0, 0, 0]^T$. By equating a to:

$$a = \begin{bmatrix} a_1 \\ a_2 \\ a_3 \end{bmatrix} \quad (7)$$

and for all the jig vertices, equating P to:

$$P = \begin{bmatrix} X'^T_{J0} & 0^T & -u_{J0} X'^T_{J0} \\ 0^T & X'^T_{J0} & -v_{J0} X'^T_{J0} \\ & \vdots & \\ X'^T_{J6} & 0^T & -u_{J6} X'^T_{J6} \\ 0^T & X'^T_{J6} & -v_{J6} X'^T_{J6} \end{bmatrix} \quad (8)$$

An equation of restraint condition:

$$Pa=0 \quad (9)$$

is obtained. Since the number of vertices of the calibration jig 402 is 7, an optimal approximate solution of a can be obtained by minimizing $|Pa|^2$ using the method of least squares, and a can be calculated as an eigenvector corresponding to a minimum eigenvalue of $P^TP$. From this result, the projection matrix A is estimated.

In step S502 (calibration movement process), the computer 140 supplies, to the robot controller 130, a robot coordinate system instruction $\Theta=[X_R, Y_R, Z_R, \theta_{RX}, \theta_{RY}, \theta_{RZ}]$ required to move the robot arm 111 to a predetermined position.

Note that $X_R, Y_R,$ and $Z_R$ are positions of the robot arm 111 on the robot coordinate system, and $\theta_{RX}, \theta_{RY},$ and $\theta_{RZ}$ are rotation angles on the robot coordinate system.

The robot controller 130 transmits the instruction received from the computer 140 to the robot arm 111, and the robot arm 111 moves to the predetermined position.

Figure 7:
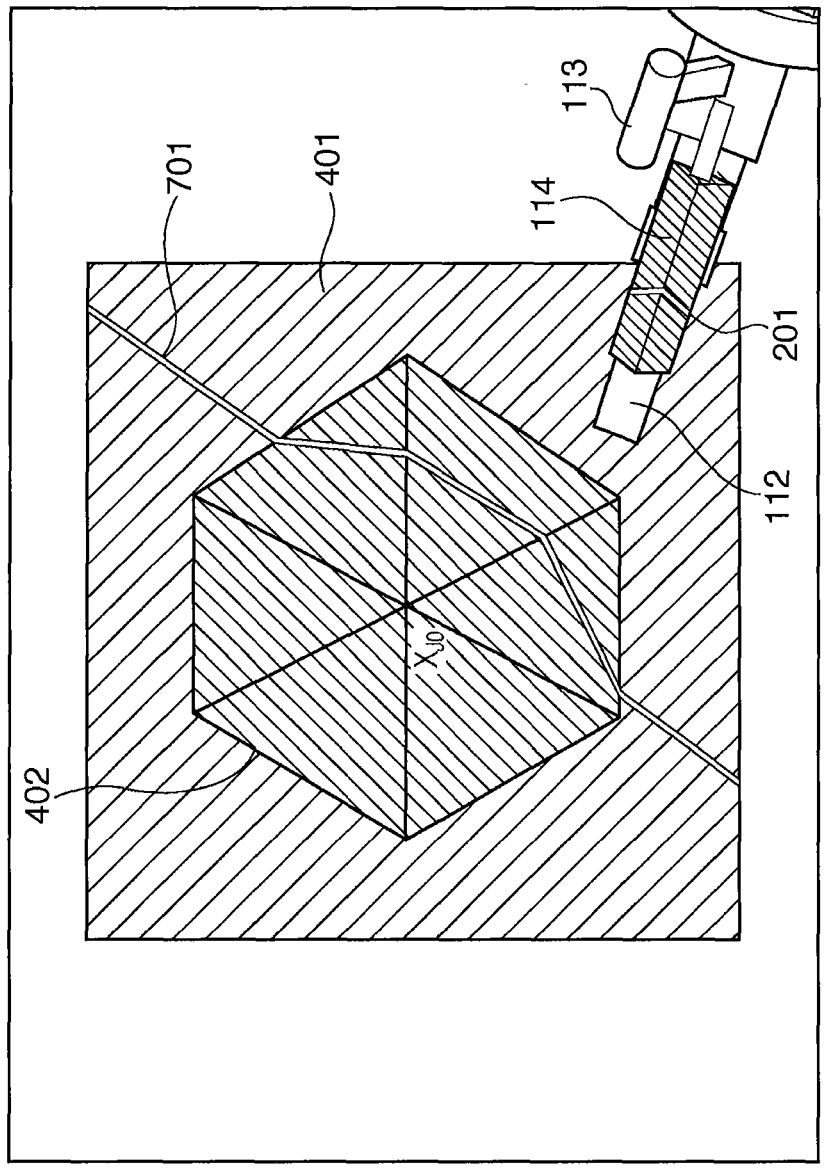
FIG. 7 is a view showing an example of image data obtained by sensing an image of the calibration jig.

In step S503 (calibration data acquisition process), after movement of the robot arm 111, the computer 140 supplies a slit light emission instruction to the slit laser projector 113 and an image sensing instruction to the camera 120. Then, image data is acquired in a state in which the calibration jig 402 and hand position detection member 114 are irradiated with the slit light (FIG. 7).

In step S504 (slit light state calculation process), an equation of plane of the light-section plane 200 on the jig coordinate system is calculated from a light-section line 701 produced by the slit light striking on the calibration jig 402.

Bright spots of the light-section line are detected from the image data, and an equation of straight line on the image coordinate system can be obtained from a set of bright spots by, for example, the method of least squares. Since the image coordinate values $u_{J0}$ to $u_{J6}$ associated with the respective vertices of the calibration jig 402 are given, it is easy to calculate intersections between sides defined by pairs of vertices on the calibration jig 402 and the light-section line 701.

Assume that an intersection between a side defined by two vertices i and j of the calibration jig 402 and the light-section line 701 is obtained as $u_L$ on the image coordinate system. With respect to coordinates $u_{Ji}$ and $u_{Jj}$ of vertices i and j on the image coordinate system, $u_L$ is an internally dividing point of these two points.

Let $u'_{Ji}, u'_{Jj},$ and $u'_L$ be corresponding points of these points on the normalized image coordinate system, and $X'_{Ji}, X'_{Jj},$ and $X'_L$ be homogeneous coordinate expressions of corresponding points $X_{Ji}, X_{Jj},$ and $X_L$ on the jig coordinate system. Assuming that $X'_L$ is a point which internally divides $X'_{Ji}$ and $X'_{Jj}$, from the result of the projective transform, we have:

$$u'_L = AX'_L = tAX'_{Ji} + (1-t)AX'_{Jj} = tu'_{Ji} + (1-t)u'_{Jj} \quad (10)$$

If respective points on the normalized image coordinate system are described as $u'_L=[x_L, y_L, z_L]$, $u'_{Ji}=[x_{Ji}, y_{Ji}, z_{Ji}]$, and $u'_{Jj}=[x_{Jj}, y_{Jj}, z_{Jj}]$, equation (10) can be written for respective elements as:

$$\begin{cases} x_L = tx_{Ji} + (1-t)x_{Jj} \\ y_L = ty_{Ji} + (1-t)y_{Jj} \\ z_L = tz_{Ji} + (1-t)z_{Jj} \end{cases} \quad (11)$$

Upon examining division of the image coordinates of $u_L = [u_L, v_L]^T$ by the scale factor of the homogeneous coordinates, we have:

$$\begin{cases} u_L = \dfrac{tx_{Ji} + (1-t)x_{Jj}}{z_L} \\ v_L = \dfrac{ty_{Ji} + (1-t)y_{Jj}}{z_L} \end{cases} \quad (12)$$

By eliminating zL from these equations, and solving them for t, we have:

$$t = \frac{v_L x_{Jj} - u_L y_{Jj}}{u_L(y_{Ji} - y_{Jj}) - v_L(y_{Ji} - y_{Jj})} \quad (13)$$

In this way, the corresponding point $X_L$ of the intersection $u_L$ on the jig coordinate system is calculated.

If at least three intersections between the light-section line 701 and the edges of the calibration jig 402 can be obtained, an equation of plane of the light-section plane 200 on the jig coordinate system can be obtained. Note that when four or more intersections are obtained, as shown in FIG. 7, an equation of approximate plane can be estimated by, for example, the method of least squares.

Letting n be a normal vector of the equation of plane obtained in this way, a vector equation of the plane is expressed, using an arbitrary point on the plane, for example, the previously measured point $X_L$, by:

$$n^T(X - X_L) = 0 \quad (14)$$

If the homogeneous coordinates of a point X are expressed by $X' = [X, Y, Z, 1]$, equation (14) can be rewritten by equating n' to $n' = [n^T, -n^T X_L]$ as:

$$n'^T X' = 0 \quad (15)$$

where n' is the Plücker coordinate expression of the equation of plane and may be normalized as follows since it is scale-invariable.

$$\hat{n}' = \frac{n'}{|n'|} \quad (16)$$

As a result, the equation of plane of the normalized light-section plane 200 is obtained as:

$$\hat{n}'^T X' = 0 \quad (17)$$

A point $x = [x, y, z]$ on the normalized image coordinate system, which is obtained by the projective transform of homogeneous coordinates X' of a certain point X on this plane using the matrix A corresponds to the homogeneous coordinates of an observation point $u = [u, v]$ on the light-section line obtained on the image. Hence, this point can be expressed as $x = [wu, wv, w]$ by rewriting z by a scale factor w. At this time, in association with a projective transform formula:

$$x = AX' \quad (18)$$

by equating X' to:

$$X' = [X^T, 1]^T, a_i = [\hat{a}_i^T, b_i]^T \ (i=1,2,3)$$

x can be written as:

$$\begin{bmatrix} wu \\ wv \\ w \end{bmatrix} = \begin{bmatrix} \hat{a}_1^T X + b_1 \\ \hat{a}_2^T X + b_2 \\ \hat{a}_3^T X + b_3 \end{bmatrix} \quad (19)$$

Hence, since 4-element simultaneous equations associated with X and w can be obtained from equations (17) and (19), coordinates X on the jig coordinate system corresponding to the observation position u on the light-section line 701 on the image data can be obtained.

In step S505 (work unit state calculation process), the state of the robot arm 111 on the jig coordinate system is calculated from the light-section line 201 striking on the hand position detection member 114. Since the hand position detection member 114 and slit laser projector 113 are arranged so that their relative positions remain unchanged, the light-section line 201 generated on the hand position detection member 114 is always generated at the same position on the hand position detection member 114.

In this case, since the hand position detection member 114 has a triangular sectional shape, the light-section line 201 on the hand position detection member 114 detected on the image can be obtained as two sides of a triangle on the jig coordinate system from equations (17) and (19).

For example, letting $n_R$ be a normal vector to a plane including the obtained triangle and $X_R$ be the barycentric position, instructions $\Theta$ on the robot coordinate system are decided to have a one-to-one correspondence with observation values $\Omega = [n_R, X_R]$ of the position and orientation of the robot arm 111.

In step S507 (calibration value calculation process), respective transform functions are generated based on the correspondence associated with the instructions on the robot coordinate system, light-section planes, and observation positions and orientations of the robot arm 111, which are acquired at a plurality of positions.

Generation of a function required to estimate a light-section plane corresponding to an instruction on the robot coordinate system will be described first. Assuming that a robot coordinate system instruction supplied to obtain i-th calibration data is $\Theta_i$, and the Plücker coordinates of the light-section plane obtained at that time are $\hat{n}'_i$, a plane equation estimation function $f(\Theta) = \hat{n}'$ required to estimate the Plücker coordinates $\hat{n}'_i$ of the light-section plane obtained upon inputting an arbitrary instruction $\Theta$ is generated. Using data sets $T = \{\Theta_i\}$ for $\forall i$ and $N = \{\hat{n}'_i\}$ for $\forall i$ as sample pairs, their transform functions may be designed to obtain approximate solutions of the plane equation estimation function f using the method of least squares by setting nonlinear function models based on polynomial regression.

When the work range of the robot arm 111 is wide, and low-order models based on polynomial regression cannot be set, approximate solutions of the plane equation estimation function f may be obtained by, for example, back-propagation learning using a multilayer perceptron.

Generation of a function required to estimate the value on the robot coordinate system corresponding to the observation values of the robot arm 111 will be described below. Assume that a robot coordinate system instruction supplied to obtain the i-th calibration data is $\Theta_i$, and the observation values of the robot arm 111 obtained at that time are $\Omega_i$. At this time, a robot coordinate estimation function g(Ω)=Θ required to estimate a robot coordinate system instruction Θ obtained upon inputting arbitrary Ω is generated.

Using data sets T={Θ$_i$} for ∀i and G={Ω$_i$} for ∀i as sample pairs, approximate solutions of the robot coordinate estimation function g are obtained in the same manner as in generation of the plane equation estimation function f in the calibration value calculation process (step S507).

Calibration parameters of the functions f and g obtained by the aforementioned processes are stored in a storage device of the computer 140 via the calibration value storage unit 305, thus ending the calibration processing.

<5. Work Processing in Work System>

The sequence of the work processing for executing a predetermined work by measuring the 3D information of a target object using the calibration parameters calculated by the aforementioned calibration method will be described below.

<5.1 Overview of Work Processing>

Figure 8:
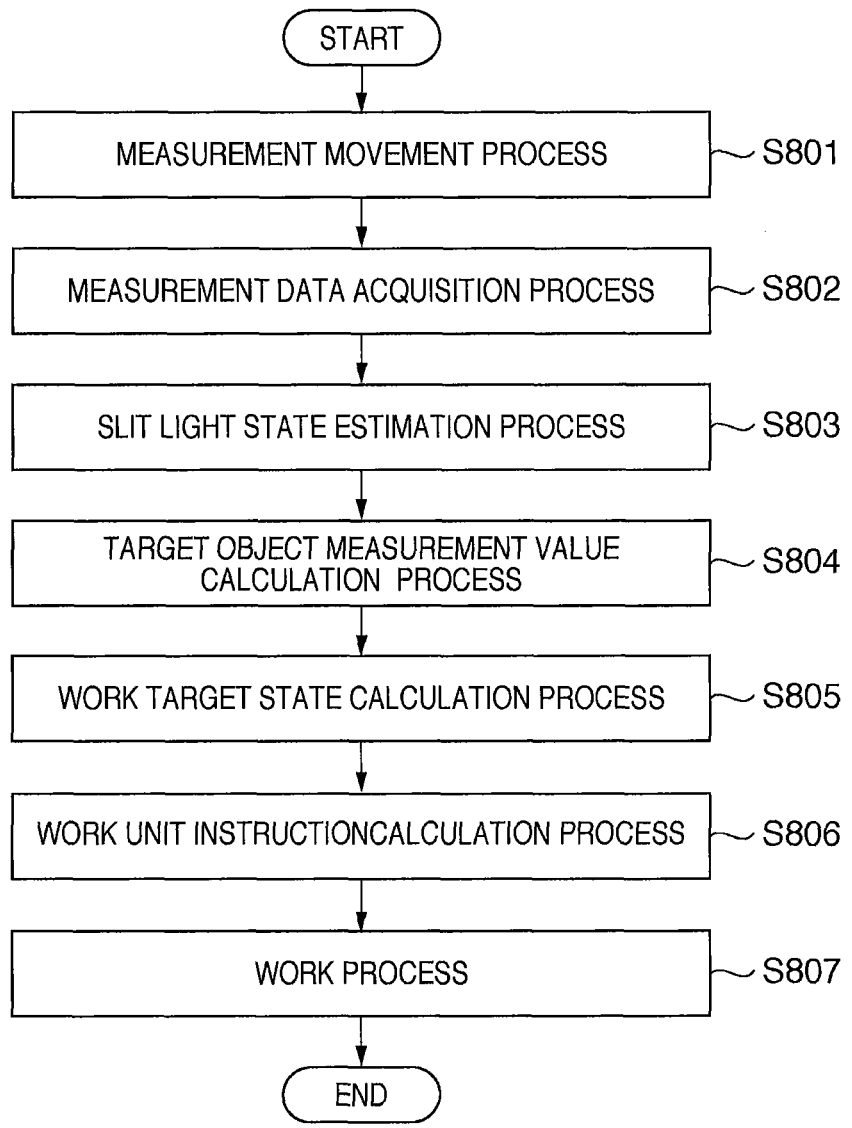
FIG. 8 is a flowchart showing the sequence of work processing in the work system.

An overview of the work processing in the work system will be described first. FIG. 8 is a flowchart showing the sequence of the work processing in the work system 100.

In step S801 (measurement movement process), the measurement value calculation unit 302 sends a moving instruction to the work control unit 130, which sends a control signal based on that instruction to the work unit 110. In response to this control signal, the work unit 110 moves to a position where a target object is irradiated with slit light.

In step S802 (measurement data acquisition process), the measurement value calculation unit 302 sends an image sensing start instruction to the measurement control unit 301, which sends control signals to the image sensing unit 120 and light projection unit 113. The image sensing unit 120 starts image sensing based on the control signal from the measurement control unit 301, and the light projection unit 113 starts emission of slit light based on the control signal from the measurement control unit 301. Note that image data acquired by the image sensing unit 120 is stored via the image data storage unit 303.

In step S803 (slit light state estimation process), the state of slit light corresponding to the instruction sent to the work control unit 130 is estimated using the correspondence function obtained based on the calibration parameters stored via the calibration value storage unit 305 (first calculation unit).

In step S804 (target object measurement value calculation process), the measurement value calculation unit 302 detects a light-section line on the target object in the image data using the image data stored via the image data storage unit 303. Then, the measurement value calculation unit 302 calculates the measurement value of the target object on the jig coordinate system based on the state of the slit light obtained in step S803 (second calculation unit).

In step S805 (work target state calculation process), the state of the work unit 110 on the jig coordinate system in desired work contents is calculated based on the target object measurement value obtained in step S804.

In step S806 (work unit instruction calculation process), an instruction to be sent to the work control unit 130 is generated based on the state of the work unit 110 on the jig coordinate system, which is calculated using the correspondence function obtained based on the calibration parameters stored via the calibration value storage unit 305.

In step S807, the instruction obtained in step S806 is transmitted to the work control unit 130, which sends a control signal based on the instruction to the work unit 110. The work unit 110 operates based on the control signal, thus executing a desired work.

<5.2 Details of Work Processing>

Details of the work processing shown in FIG. 8 will be described below.

In step S801 (measurement movement process), the robot arm 111 is moved to a predetermined position. In step S802 (measurement data acquisition process), the slit laser projector 113 emits slit light, and the camera 120 acquires image data.

In step S803 (slit light state estimation process), the Plücker coordinates n̂' of a light-section plane to be obtained in response to an instruction Θ supplied to the robot arm 111 in step S802 is estimated using the plane equation estimation function f obtained at the time of calibration.

In step S804 (target object measurement value calculation process), the light-section line on the target object 160 is detected, and n̂' obtained in step S803 (slit light state estimation process) is substituted in equations (17) and (19) to calculate the coordinate values of respective bright spot positions on the light-section line on the jig coordinate system.

In step S805 (work target state calculation process), the position and orientation of the robot arm 111 on the jig coordinate system, which are required to attain a desired work, are calculated based on the measurement result of the target object 160 obtained in step S804 (target object measurement value calculation process).

By detecting the light-section line on the hand position detection member 114 first, the positions on the jig coordinate system associated with bright spots on the light-section line generated on the hand position detection member 114 are calculated in the same sequence as in step S804 (target object measurement value calculation process).

Based on the calculation result, the values Ω=[n$_R$, X$_R$] on the jig coordinate system of the normal vector and barycenter of a triangle defined by the light-section line on the hand position detection member 114 are calculated in the same sequence as in step S505 (work unit state calculation process).

The required target state depends on the work contents. A case will be explained below wherein the target object is gripped. Based on the relative positional relationship between the measurement result of the target object 160 and that of the hand position detection member 114, if the robot arm 111 is required to move by ΔΩ=[Δn$_R$, ΔX$_R$] on the jig coordinate system, the target state can be obtained as:

$$\hat{\Omega}=[n_R+\Delta n_R, X_R+\Delta X_R]$$

In step S806 (work unit instruction calculation process), the target state Ω̂ calculated in step S805 (work target state calculation process) is transformed onto the robot coordinate system as an instruction to be supplied to the robot arm 111. By giving, as an input value, Ω̂ to the coordinate estimation function g obtained at the time of calibration, the corresponding coordinate value Θ̂ on the robot coordinate system can be obtained.

In step S807 (work process), the instruction Θ̂ to the robot arm 111 obtained in step S806 (work unit instruction calculation process) is transmitted to the robot controller 130 to move the robot arm 111, thus executing a desired work.

As can be apparent from the above description, the work system 100 according to this embodiment adopts the arrangement in which the camera 120 is arranged at a position independent of the robot arm 111 without integrating the camera 120, slit laser projector 113, and hand position detection member 114. Also, the work system 100 adopts the arrangement in which the slit laser projector 113 and hand position detection member 114 are arranged on the robot arm 111.

With this arrangement, problems regarding occlusion and that regarding the focal depth of beam light can be avoided. Since a large optic angle can be assured, high measurement precision can be attained in the depth direction, and the camera with a high resolution can be arranged irrespective of the size of the robot arm.

Furthermore, by specifying the 3D information measurement method and calibration method applied to this work system, this embodiment demonstrates the feasibility of the measurement of the 3D information in the work system.

Second Embodiment

The work processing in the first embodiment is premised on that 3D information enough to execute a work in step S807 (work process) is calculated in step S804.

However, 3D information required to uniquely estimate, for example, the position and orientation of the target object 160 as the calculation result in step S804 may not be obtained in some cases. Thus, this embodiment will explain work processing premised on that 3D information that suffices to execute a work in step S807 (work process) cannot often be obtained.

Note that the outer appearance arrangement, functional arrangement, and calibration processing of the work system according to this embodiment are basically the same as those of the work system according to the first embodiment, and a description thereof will not be repeated.

Figure 9:
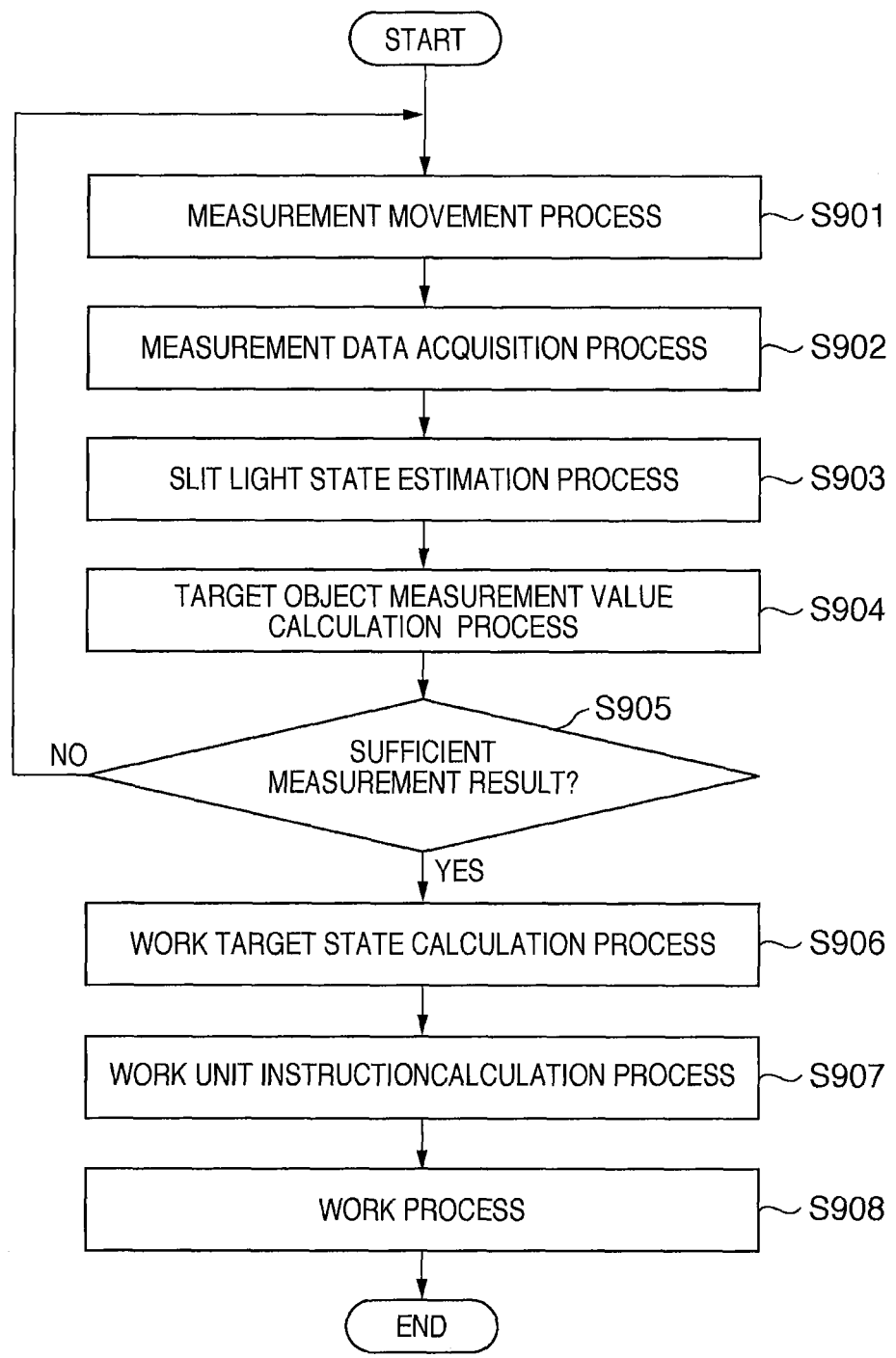
FIG. 9 is a flowchart showing the sequence of work processing in a work system according to the second embodiment of the present invention.

FIG. 9 is a flowchart showing the sequence of work processing in the work system according to this embodiment.

In step S901 (measurement movement process) to step S904 (target object measurement value calculation process), the same processes as in step S801 (measurement movement process) to step S804 (target object measurement value calculation process) in the work processing in the work system according to the first embodiment are executed.

It is determined in step S905 if 3D information enough to execute a work for the target object is obtained as the measurement result in step S904.

If it is determined in step S905 that sufficient 3D information is not obtained, the process returns to step S901 (measurement movement process). Then, the work unit 110 is moved to a position different from the current position to emit slit light from the different position, thus acquiring addition 3D information.

On the other hand, if it is determined in step S905 that sufficient 3D information is obtained, the process advances to step S906. In step S906 (work target state calculation process) to step S908 (work process), the same processes as in step S805 (work target state calculation process) to step S807 (work process) in the work processing in the work system according to the first embodiment are executed.

As can be seen from the above description, this embodiment can also cope with a case in which 3D information enough to execute a work in the work process is not obtained, while receiving the effects obtained by the first embodiment.

Third Embodiment

In the first embodiment, the irradiation angle of slit light to be emitted is fixed, and the shape of the hand position detection member is defined to uniquely determine the position and orientation of the robot arm 111 based on the sensed light-section line 201.

However, the present invention is not limited to this. For example, the irradiation angle of slit light to be emitted by the slit laser projector 113 may be variable so as to uniquely determine the position and orientation of the robot arm 111. Details of this embodiment will be described below.

<1. Outer Appearance Arrangement of Work Unit>

Figure 10:
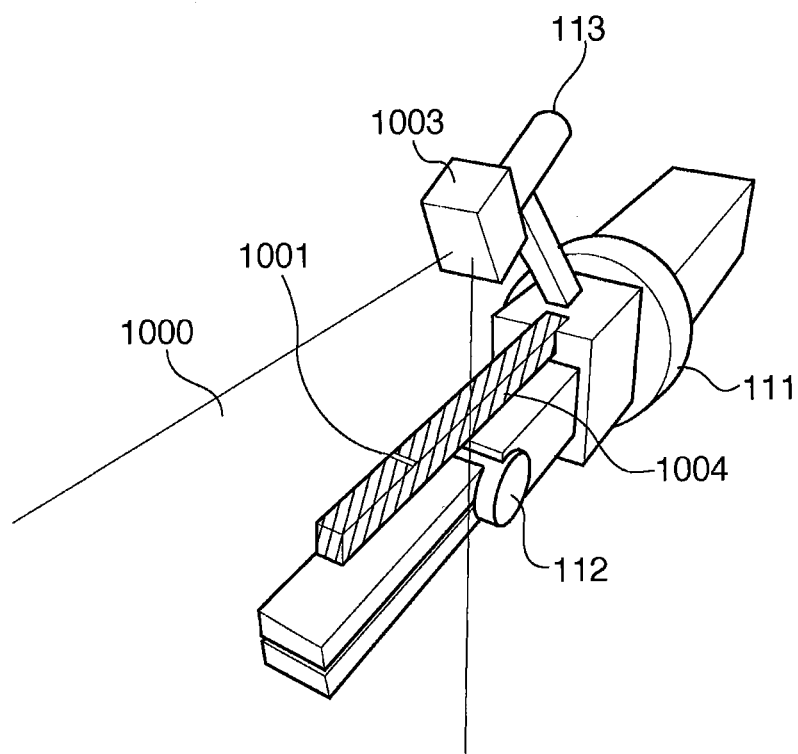
FIG. 10 is a view showing the outer appearance arrangement of a work unit of a work system according to the third embodiment of the present invention.

FIG. 10 is a view showing the outer appearance arrangement of a work unit of a work system according to this embodiment. Referring to FIG. 10, reference numeral 1003 denotes a movable galvano mirror or polygon mirror, which serves as a light scanning unit. As shown in FIG. 10, the light scanning unit 1003 is arranged on the front portion of the slit laser projector 113 to change the irradiation angle of a light-section plane 1000 of slit light based on an instruction from the measurement control unit 301.

Note that the light scanning unit 1003 generates K light-section lines per scan. Let $\alpha_k$ be a slit light irradiation angle from the origin position of the light scanning unit 1003, which is required to generate the k-th light-section line of these K lines. K and $\alpha_1$ to $\alpha_k$ are fixed values, which are defined in advance, and the same values are used in the calibration processing and work processing.

Reference numeral 1004 denotes a hand position detection member. Note that since K light-section lines are generated per scan on the hand position detection member 1004, the hand position detection member 1004 need not have a complicated shape unlike in the first embodiment, and it may be, for example, a flat plate, as shown in FIG. 10. When the hand position detection member 1004 has a flat plate shape, a light-section line 1001 forms one straight line.

<2. Measurement Principle of Target Object in Work System>

The calibration method required to measure 3D information by the light-section method will be described below.

<2.1 Description of Calibration Jig>

A calibration jig used in calibration of the work system according to this embodiment is the same as that used in calibration of the work system according to the first embodiment, and a description thereof will not be repeated.

<2.2 Details of Calibration Processing>

The sequence of the calibration processing in the work system according to this embodiment will be described below. FIG. 11 is a flowchart showing the sequence of the calibration processing in the work system.

In step S1101 (jig coordinate system setting process) and step S1102 (calibration movement process), the same processes as in step S501 (jig coordinate system setting process) and step S502 (calibration movement process) described in the first embodiment are executed.

Note that in step S1102, after a counter value k used to count the number of times of change of the slit light irradiation angle is reset to 1, the process advances to step S1103 (irradiation angle change process).

In step S1103 (irradiation angle change process), a slit light irradiation angle in the light scanning unit 1003 is set to be $\alpha_k$.

In step S1104 (calibration data acquisition process) and step S1105 (slit light state calculation process), the same processes as in step S503 (calibration data acquisition process) and step S504 (slit light state calculation process) described in the first embodiment are executed. With these processes, an equation of plane of the light-section plane 1000 on the jib coordinate system is obtained.

In step S1106 (work unit measurement process), the coordinate value on the jig coordinate system associated with light-section line obtained at the slit light irradiation angle $\alpha_k$ on the hand position detection member 1004 is calculated using equations (17) and (19).

It is checked in step S1107 if the counter value k=K. If it is determined in step S1107 that the counter value k<K, the counter value k is incremented, and the process then returns to step S1103.

On the other hand, if it is determined in step S1107 that the counter value k=K, the process advances to step S1108.

In step S1108 (work unit state calculation process), the position and orientation of the robot arm 111 on the jig coordinate system are calculated based on the coordinate values on the jig coordinate system associated with the light-section lines on the hand position detection member 1004 obtained at the slit light irradiation angles $\alpha_1$ to $\alpha_k$.

Figure 12:
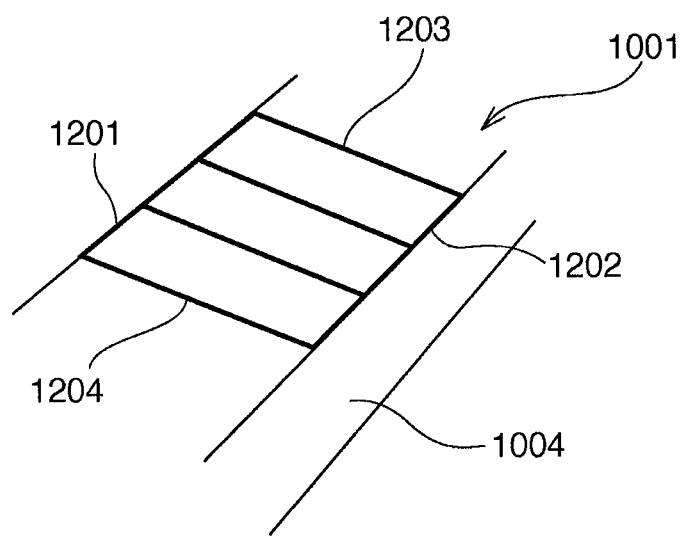
FIG. 12 is a view showing an example of light-section lines.

If the hand position detection member 1004 is, for example, a flat plate, as shown in FIG. 10, the light-section lines on the hand position detection member 1004 obtained at the slit light irradiation angles $\alpha_1$ to $\alpha_k$ are as shown in FIG. 12.

That is, K line segments on a single plane are formed on the jig coordinate system, and their normal direction $n_R$ can be obtained by, for example, the method of least squares. Also, the barycentric position of a region bounded by edges 1201 and 1202 of the hand position detection member 1004 and light-section lines 1203 and 1204 as those at two ends is calculated as $X_R$. Then, instructions Θ on the robot coordinate system are decided to have one-to-one correspondence with observation values $\Omega=[n_R, X_R]$ of the position and orientation of the robot arm 111.

It is checked in step S1109 if the number of times of data acquisition reaches a predetermined value. If it is determined in step S1109 that the number of times of data acquisition does not reach the predetermined value, the process returns to step S1102, and the robot arm 111 is moved to another position to continue acquisition of calibration data.

On the other hand, if it is determined in step S1109 that the number of times of data acquisition reaches the predetermined value, the process advances to step S1110.

In step S1110 (calibration value calculation process), respective transform functions are generated based on the correspondence associated with instructions on the robot coordinate system, light-section planes, and the observation positions and orientations of the robot arm 111 acquired at the plurality of positions and the plurality of slit light irradiation angles.

Assume that a robot coordinate system instruction supplied to obtain calibration data at the i-th calibration position is $\Theta_i$, and Plücker coordinates of light-section planes respectively obtained at the slit light irradiation angles $\alpha_1$ to $\alpha_k$ at that time are $\hat{n}'_{ik}$. At this time, a plane equation estimation function $f(\Theta, \alpha)=\hat{n}'$ required to estimate Plücker coordinates $\hat{n}'$ of a light-section plane obtained upon inputting arbitrary Θ and α is generated.

Using data sets $T=\{[\Theta_i,\alpha_k]\}$ for ∀i, k and $N=\{\hat{n}'_{ik}\}$ for ∀i, k as sample pairs, their transform functions may be designed to obtain approximate solutions of the plane equation estimation function f using the method of least squares by setting nonlinear function models based on polynomial regression. When the work range of the robot arm 111 is wide, and low-order models based on polynomial regression cannot be set, approximate solutions of the plane equation estimation function f may be obtained by, for example, back-propagation learning using a multilayer perceptron.

Assume that a robot coordinate system instruction supplied to obtain the i-th calibration data is $\Theta_i$, and the observation values of the robot arm 111 obtained by irradiating slit light beams at the slit light irradiation angles $\alpha_1$ to $\alpha_k$ at that time are $\Omega_i$. At this time, a robot coordinate estimation function $g(\Omega)=\Theta$ required to estimate a robot coordinate system instruction Θ obtained upon inputting arbitrary Ω is generated.

Using data sets $T=\{\Theta_i\}$ for ∀i and $G=\{\Omega_i\}$ for ∀i as sample pairs, approximate solutions of the robot coordinate estimation function g are obtained in the same manner as in generation of the plane equation estimation function f in step S1110 (calibration value calculation process).

Calibration parameters of the functions f and g obtained by the aforementioned processes are stored in a storage device of the computer 140 via the calibration value storage unit 305.

<3. Details of Work Processing>

Figure 13:
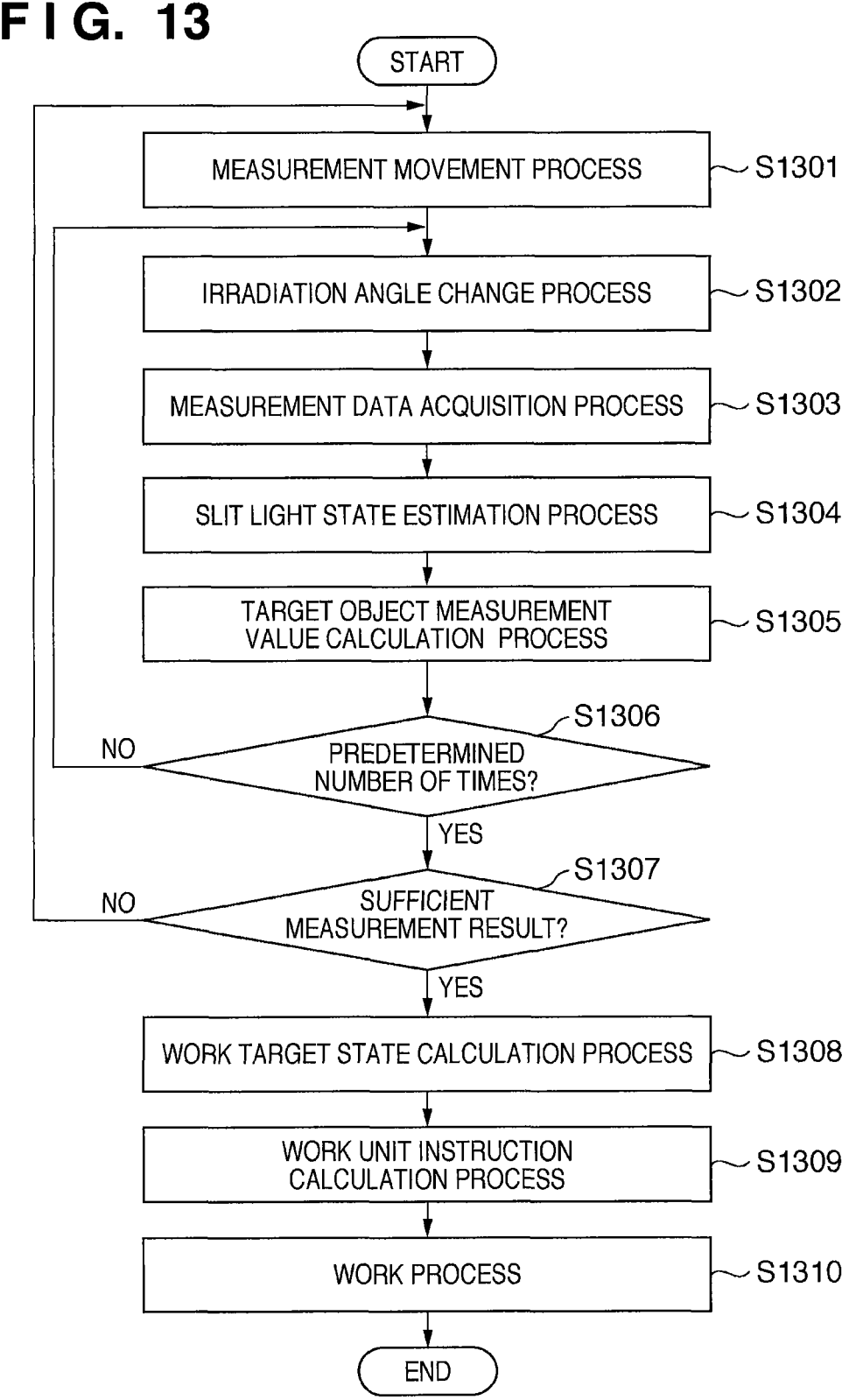
FIG. 13 is a flowchart showing the sequence of work processing in the work system.

Details of the work processing in the work system according to this embodiment will be described below. FIG. 13 is a flowchart showing the sequence of the work processing in the work system according to this embodiment.

In step S1301 (measurement movement process), the same process as in step S801 (measurement movement process) in the first embodiment is executed, and the robot arm 111 is moved. Note that in step S1301, after the counter value k used to count the number of times of change of the slit light irradiation angle is reset to 1, the process advances to step S1302 (irradiation angle change process).

In step S1302 (irradiation angle change process), a slit light irradiation angle in the galvano mirror 1003 is set to be $\alpha_k$.

In step S1303 (measurement data acquisition process) to step S1305 (target object measurement value calculation process), the same processes as in the first embodiment are executed to calculate the coordinate value on the jig coordinate system of a light-section line on the target object 160.

It is checked in step S1306 if the counter value k=K. If it is determined in step S1306 that the counter value k<K, the counter value k is incremented, and the process returns to step S1302.

On the other hand, if it is determined in step S1306 that the counter value k=K, the process advances to step S1307.

It is determined in step S1307 if 3D information that suffices to execute a work for the target object is obtained as the measurement result. For example, if it is determined that 3D information required to uniquely estimate the position and orientation of the target object 160 is not obtained, it is determined that sufficient 3D information is not obtained, and the process returns to step S1301. Then, the robot arm 111 is moved to a position different from the current position, and additional 3D information is acquired by irradiating slit light from the different position.

On the other hand, if it is determined in step S1307 that 3D information that suffices to execute a work for the target object is obtained as the measurement result, the process advances to step S1308.

In step S1308 (work target state calculation process), the same process as in the work unit state calculation process (step S1108) at the time of calibration is executed to calculate the position and orientation of the robot arm 111.

In step S1309 (work unit instruction calculation process) and step S1310 (work process), the same processes as in the first embodiment are executed.

As can be seen from the above description, this embodiment adopts the arrangement in which the irradiation angle of slit light emitted by the slit laser projector 113 is variable. Then, the position and orientation of the robot arm 111 can be uniquely calculated irrespective of the shape of the hand position detection member.

Fourth Embodiment

In the first, second, and third embodiments, the light projection unit 113 projects slit light.

However, the present invention is not limited to this. For example, an arrangement in which a pattern light projector used to attain spatial coding is used as the light projection unit 113 may be adopted.

Note that spatial coding is a method of coding a space by irradiating and sensing a binary pattern light combination based on a density pattern emitted by a light projector, while changing it in synchronism with a camera, and obtaining distance information by a triangulation with an associated light projection position from the coded space. Details of this embodiment will be described below.

Figure 14:
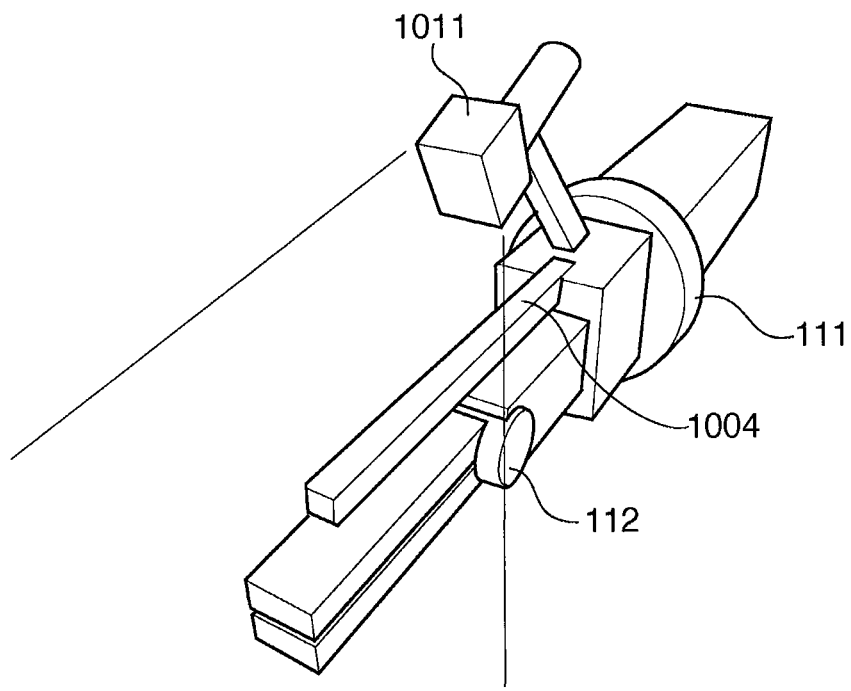
FIG. 14 is a view showing the outer appearance arrangement of a work unit of a work system according to the fourth embodiment of the present invention.

FIG. 14 is a view showing the outer appearance arrangement of a work unit of a work system according to this embodiment. Referring to FIG. 14, reference numeral 1011 denotes a pattern light projector which projects pattern light while switching a pattern in synchronism with the camera 120 based on an instruction from the measurement control unit 301.

As shown in FIG. 15, a 1-byte information amount is included at an arbitrary position in a sensed image using binary pattern light projected once by the pattern light projector 1011. In this case, for example, as shown in FIG. 16, N types of pattern light based on changes to double the frequencies of periodic patterns in the vertical direction are given, and images of respective light projection patterns are sensed. Then, by binarizing luminance changes at an arbitrary position on an image and time-serially arranging them, N-byte binary code information is given.

At this time, a point group on an image having an identical binary code is located on an identical irradiation plane from the pattern light projector 1011, as shown in the example of FIG. 15, since it undergoes an identical pattern light change. For this reason, when the aforementioned pattern change is used, points on $2^N$ planes can be discriminated on an image.

By examining these $2^N$ planes as K light-section planes, a problem equivalent to the third embodiment is to be solved, and calibration data acquisition and 3D information acquisition of a target object at the time of a work can be attained by the same method as in the third embodiment.

As can be seen from the above description, this embodiment adopts the arrangement in which the pattern light projector which projects pattern light is used as the light projection unit 113.

As a result, even in spatial coding based on pattern light, 3D information can be measured and calibrated by the same method as in the third embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-301714 filed Nov. 26, 2008, which is hereby incorporated by reference herein in its entirety.

What is claimed is:

1. A work system comprising:
   an arm mechanism, a position and an orientation of which are configured to be changed so as to process an object placed on a work area;
   a member arranged at a distal end portion of said arm mechanism to receive a light projection pattern for calculating a position and an orientation of the distal end portion of said arm mechanism;
   an irradiation unit configured to form the light projection pattern on said member and on the object by irradiating said member and the object with pattern light, said irradiation unit being arranged on said arm mechanism to have a constant relative position with respect to said member;
   an image sensing unit configured to sense an image of the object, said image sensing unit being fixed at a position independent of said arm mechanism;
   a first calculation unit configured to calculate a position and an orientation of the distal end portion of said arm mechanism and an irradiation plane of the pattern light based on the light projection pattern formed on said member included in image data of the object obtained by said image sensing unit; and
   a second calculation unit configured to calculate a position and an orientation of the object based on the calculated irradiation plane and the light projection pattern formed on the object included in the image data of the object obtained by said image sensing unit.

2. The system according to claim 1, further comprising a control unit configured to control an operation of said arm mechanism based on the position and the orientation of the distal end portion of said arm mechanism calculated by said first calculation unit, and the position and the orientation of the object calculated by said second calculation unit.

3. The system according to claim 1, wherein said irradiation unit is a slit light projector which irradiates said member and the object with slit light as the pattern light, and forms a light-section line as the light projection pattern on said member and on the object.

4. The system according to claim 3, wherein said member has a shape with which the light-section line formed on said member by the slit light irradiated by said irradiation unit becomes a light-section line defined by at least two straight lines.

5. The system according to claim 3, wherein said irradiation unit is configured to change an irradiation angle with respect to said member.

6. The system according to claim 5, wherein said member has a shape with which the light-section line formed on said member by the slit light irradiated by said irradiation unit becomes a light-section line defined by at least one straight line.

7. The system according to claim 6, wherein said first calculation unit calculates positions and orientations of the distal end portion of said arm mechanism and the light-section planes of the slit light based on a plurality of light-section lines formed by changing the irradiation angle with respect to said member.

8. The system according to claim 1, wherein said second calculation unit calculates the position and the orientation of the object to be processed based on a relationship between the position and the orientation of said arm mechanism and the irradiation plane of the pattern light, which are calculated based on a light projection pattern formed on an object having given dimensions by irradiating the object having the given dimensions with the pattern light by said irradiation unit when said arm mechanism is located at a predetermined position and orientation.

9. The system according to claim 1, wherein said irradiation unit is a pattern light projector which irradiates said member and the object with pattern light which time-serially changes, and time-serially forms light projection patterns on said member and on the object.

10. An information processing method in a work system which comprises:
   an arm mechanism, a position and an orientation of which are configured to be changed so as to process an object placed on a work area; and
   a member arranged at a distal end portion of the arm mechanism to receive a light projection pattern for calculating a position and an orientation of the distal end portion of the arm mechanism, the method comprising the steps of:
   forming a light projection pattern on the member and on the object by irradiating the member and the object with pattern light provided by an irradiation unit, the irradiation unit being arranged on the arm mechanism to have a constant relative position to the member; and
   sensing an image of the object with an image sensing unit fixed at a position independent of the arm mechanism;
   calculating a position and an orientation of the distal end portion of the arm mechanism and an irradiation plane of the pattern light based on the light projection pattern formed on the member included in image data of the object obtained by the image sensing unit; and
   calculating a position and an orientation of the object to be processed based on the calculated irradiation plane and the light projection pattern formed on the object to be processed included in the image data of the object obtained by the image sensing unit.

11. A non-transitory computer-readable storage medium storing a program for making a computer execute an information processing method according to claim 10.

12. A system comprising:
   an arm mechanism;
   an irradiation unit configured to irradiate an object with pattern light, the irradiation unit being arranged on the arm mechanism;
   an image sensing unit configured to sense an image of the object, said image sensing unit being at a position independent of said arm mechanism;
   a holding unit configured to hold a calibration parameter for calibrating a position of the irradiated pattern light, wherein the calibration parameter is generated through a calibration process using a position of the arm mechanism and a position of the irradiated pattern light; and
   an obtaining unit configured to obtain a position and an orientation of the object based on (i) a light projection pattern irradiated by said irradiation unit and formed on the object, included in the image of the object which is obtained by said image sensing unit, and (ii) the calibration parameter held by the holding unit.

13. The system according to claim 12, further comprising a control unit configured to control movement of the arm mechanism in accordance with a received instruction, wherein the parameter indicates relationship between a position of the irradiated pattern light and the position of the arm mechanism designated by the instruction.

14. The system according to claim 12, wherein said irradiation unit is further configured to irradiate the object with slit pattern light to form a light-section line on the object as the light projection pattern.

15. The system according to claim 12, wherein said irradiation unit is further configured to irradiate the object with pattern light which changes time-serially.

16. The system according to claim 12, wherein said irradiation unit is further configured to irradiate the object with pattern light in accordance with a spatial coding method.

17. The system according to claim 12, wherein the calibration parameter indicates a relationship between an actual position of the irradiated pattern light and a target position of the arm mechanism as instructed by a movement instruction, and
   the calibration parameter is generated through a calibration process including:
      moving the arm mechanism in response to each of a plurality of movement instructions indicating the target position;
      sensing images of the object using the image sensing unit, while the object is irradiated with the pattern light from the irradiation unit after the arm mechanism has moved in response to the respective instructions indicating the target position; and
      calculating the calibration parameter using a plurality of the sensed images.

18. An information processing method comprising: irradiating an object with pattern light by an irradiation unit being arranged on an arm mechanism;
   sensing an image of the object by an image sensing unit being at a position independent of the arm mechanism;
   holding a calibration parameter for calibrating a position of the irradiated pattern light, wherein the calibration parameter is generated through a calibration process using a position of the arm mechanism and a position of the irradiated pattern light; and
   obtaining a position and an orientation of the object based on (i) a light projection pattern irradiated by said irradiation unit and formed on the object, included in the image of the object which is obtained by the image sensing unit, and (ii) the calibration parameter held in the holding step.

19. A non-transitory computer-readable storage medium storing a program for making a computer execute an information processing method according to claim 18.

* * * * *